(12) United States Patent
Buttazzoni

(10) Patent No.: US 8,910,955 B1
(45) Date of Patent: Dec. 16, 2014

(54) LIGHTWEIGHT DOLLY ASSEMBLY

(71) Applicant: Luca Buttazzoni, Miami, FL (US)

(72) Inventor: Luca Buttazzoni, Miami, FL (US)

(*) Notice: Subject to any disclaimer, the term of this patent is extended or adjusted under 35 U.S.C. 154(b) by 0 days.

(21) Appl. No.: 14/173,246

(22) Filed: Feb. 5, 2014

Related U.S. Application Data

(63) Continuation of application No. 14/095,671, filed on Dec. 3, 2013, now abandoned.

(51) Int. Cl.
*B62B 1/12* (2006.01)
*B62B 3/00* (2006.01)

(52) U.S. Cl.
CPC ........................................ *B62B 3/00* (2013.01)
USPC ...................................................... 280/79.11

(58) Field of Classification Search
USPC ........................... 280/638–43.24, 79.11–79.7; 5/706–715, 413 AM
See application file for complete search history.

(56) References Cited

U.S. PATENT DOCUMENTS

| | | |
|---|---|---|
| 123,147 A | 1/1872 | Blackman |
| 189,531 A | 4/1877 | Voorhees |
| 208,650 A | 10/1878 | Tucker |
| 217,172 A | 7/1879 | Tucker |
| RE9,283 E | 7/1880 | Woodruff |
| 357,406 A | 2/1887 | Nelms |
| 375,406 A | 12/1887 | Wilson et al. |
| 378,135 A | 2/1888 | Hess |
| 442,825 A | 12/1890 | Randall |
| 444,020 A | 1/1891 | Rogers et al. |
| 511,793 A | 1/1894 | Philion |
| 520,319 A | 5/1894 | Kynoch |
| 525,298 A | 8/1894 | Thiele et al. |
| 600,172 A | 3/1898 | Rechtsteiner |
| 843,234 A | 2/1907 | Rawlinson |
| 970,386 A | 9/1910 | Nickerson |
| 1,265,850 A | 5/1918 | Wierszewska |
| 1,461,027 A | 7/1923 | Brockson |
| 1,508,232 A | 9/1924 | Milosy |
| 1,887,067 A | 11/1932 | Pehrsson |
| 1,918,604 A | 7/1933 | Johnson |
| 1,942,112 A | 1/1934 | McQuilkin |
| 2,048,608 A | 7/1936 | Holland |
| 2,186,368 A | 1/1940 | Conger |
| 2,423,711 A | 7/1947 | Knox |

(Continued)

FOREIGN PATENT DOCUMENTS

| | | |
|---|---|---|
| GB | 2423012 | 8/2006 |
| JP | 6293201 | 10/1994 |

*Primary Examiner* — Jeffrey J Restifo
*Assistant Examiner* — Erez Gurari
(74) *Attorney, Agent, or Firm* — Malloy & Malloy, P.L.

(57) ABSTRACT

A dolly assembly including a base formed of a lightweight, at least partially flexible material, which may be in the form of an inflatable construction or a substantially solid, one-piece construction. The base includes a plurality of pockets, or in some embodiments apertures, extending there-through and a plurality of casters each mounted on the base by extending through a different one of the plurality of pockets. At least some of said casters include a head portion having a sufficiently large transverse dimension to restrict passage of the caster through a corresponding one of the pockets. The enlarged head of the plurality of casters are disposed in an exposed relation to an outer surface of the base in confronting relation to an object supported on the base, wherein the lightweight characteristics of the material from which the base is formed necessitate a significant and/or majority of the weight of the supported object being accommodated by the plurality of casters.

11 Claims, 12 Drawing Sheets

(56) References Cited

U.S. PATENT DOCUMENTS

| | | | |
|---|---|---|---|
| 2,490,879 | A | 12/1949 | Milich |
| 2,500,215 | A | 3/1950 | Swearingen |
| 2,534,367 | A | 12/1950 | Perrotta et al. |
| 2,575,189 | A | 11/1951 | Schmidt |
| 2,654,421 | A | 10/1953 | Neff |
| 2,661,220 | A | 12/1953 | Davis |
| D177,208 | S | 3/1956 | Berlin |
| 2,830,824 | A | 4/1958 | Young |
| 2,849,241 | A | 8/1958 | Owen |
| 3,007,710 | A | 11/1961 | Sykes |
| 3,285,447 | A | 11/1966 | Junion |
| 3,329,442 | A | 7/1967 | Di Vietri |
| 3,367,675 | A | 2/1968 | Gearin |
| 3,389,421 | A | 6/1968 | Wheeler |
| 3,522,951 | A | 8/1970 | Tyson |
| 3,559,802 | A | 2/1971 | Eidus |
| 3,577,620 | A | 5/1971 | Hoffman et al. |
| 3,802,717 | A | 4/1974 | Eitreim |
| 3,831,959 | A | 8/1974 | Fontana |
| 3,871,676 | A | 3/1975 | Renard et al. |
| 3,923,318 | A | 12/1975 | Renard et al. |
| 3,963,256 | A | 6/1976 | Stafford |
| 3,964,762 | A | 6/1976 | Adams |
| 3,983,821 | A | 10/1976 | Kearns |
| 4,023,816 | A * | 5/1977 | Ellman et al. ............ 280/1.13 |
| 4,178,006 | A | 12/1979 | Johnson |
| 4,274,644 | A | 6/1981 | Taylor |
| 4,285,550 | A | 8/1981 | Blackburn et al. |
| 4,381,054 | A | 4/1983 | Rumpel |
| 4,382,637 | A | 5/1983 | Blackburn et al. |
| 4,392,665 | A | 7/1983 | Miller et al. |
| 4,402,506 | A | 9/1983 | Jones |
| 4,576,389 | A | 3/1986 | Villaveces et al. |
| 4,647,056 | A | 3/1987 | Baker |
| 4,720,115 | A | 1/1988 | Rehrig |
| 4,725,028 | A | 2/1988 | Conradt |
| 4,743,039 | A | 5/1988 | Ellis |
| 4,778,041 | A | 10/1988 | Blaurock |
| 4,799,288 | A | 1/1989 | Kimizawa |
| 4,824,129 | A | 4/1989 | Rehrig |
| 4,969,657 | A | 11/1990 | Kaufmann |
| 4,996,738 | A | 3/1991 | Tifre |
| 5,033,758 | A | 7/1991 | Levy |
| 5,123,665 | A | 6/1992 | Levy |
| 5,144,708 | A | 9/1992 | Pekar |
| 5,219,058 | A | 6/1993 | Sundseth |
| 5,230,408 | A | 7/1993 | Sadow |
| 5,318,312 | A | 6/1994 | Montemayor |
| 5,379,485 | A | 1/1995 | Oshins et al. |
| 5,393,079 | A | 2/1995 | Wang |
| 5,564,143 | A | 10/1996 | Pekar et al. |
| 5,599,031 | A | 2/1997 | Hodges |
| 5,726,368 | A | 3/1998 | Shaw |
| 5,737,801 | A | 4/1998 | Flood |
| 5,803,471 | A | 9/1998 | DeMars et al. |
| 5,829,765 | A | 11/1998 | Snider |
| 6,038,734 | A | 3/2000 | Facchin |
| 6,095,534 | A | 8/2000 | Wong |
| 6,134,747 | A | 10/2000 | Leibman |
| 6,179,374 | B1 | 1/2001 | Tang |
| 6,354,619 | B1 | 3/2002 | Kim |
| 6,382,643 | B1 | 5/2002 | Baker |
| 6,419,198 | B1 | 7/2002 | Einav |
| 6,491,318 | B1 | 12/2002 | Galt et al. |
| 6,772,478 | B2 | 8/2004 | Herder et al. |
| 6,776,382 | B1 | 8/2004 | Papadopoulos et al. |
| 6,877,622 | B2 | 4/2005 | Tsai |
| 6,942,605 | B1 | 9/2005 | Sukhovitsky |
| 6,964,423 | B1 | 11/2005 | Chieh et al. |
| 7,036,161 | B2 | 5/2006 | Harrison et al. |
| 7,055,847 | B2 | 6/2006 | Miller et al. |
| 7,188,859 | B2 | 3/2007 | Hardin et al. |
| 7,305,737 | B2 | 12/2007 | Libakken |
| 7,421,956 | B1 | 9/2008 | McCarthy et al. |
| 7,441,786 | B2 * | 10/2008 | Stryker et al. ............ 280/79.11 |
| 7,478,835 | B2 | 1/2009 | Autenrieth |
| 7,547,037 | B2 | 6/2009 | Poppinga et al. |
| 7,621,858 | B2 | 11/2009 | Sheron |
| 8,011,686 | B2 | 9/2011 | Chen et al. |
| 8,096,566 | B2 | 1/2012 | West |
| 8,205,841 | B2 | 6/2012 | Wood |
| 8,220,824 | B2 | 7/2012 | Chen et al. |
| 8,684,372 | B2 | 4/2014 | Buttazzoni |
| 2003/0034636 | A1 | 2/2003 | Ng |
| 2003/0155389 | A1 | 8/2003 | Swartzentruber |
| 2004/0173996 | A1 | 9/2004 | Anderson |
| 2005/0071949 | A1 * | 4/2005 | Martinez et al. ............ 16/30 |
| 2005/0211862 | A1 | 9/2005 | Autenrieth |
| 2006/0097468 | A1 | 5/2006 | Sugrue |
| 2006/0279054 | A1 | 12/2006 | Chung et al. |
| 2007/0029747 | A1 | 2/2007 | Islo et al. |
| 2009/0167008 | A1 | 7/2009 | Autenrieth |
| 2009/0178821 | A1 | 7/2009 | Zavidniak et al. |
| 2009/0184482 | A1 | 7/2009 | Scott |
| 2009/0212514 | A1 | 8/2009 | Moorman, Jr. |
| 2010/0066057 | A1 | 3/2010 | Jian |
| 2010/0237575 | A1 | 9/2010 | Price et al. |
| 2011/0089671 | A1 | 4/2011 | Baatz et al. |
| 2012/0013105 | A1 | 1/2012 | Freeman et al. |
| 2012/0087216 | A1 | 4/2012 | Keung et al. |
| 2014/0021691 | A1 | 1/2014 | Buttazzoni et al. |

* cited by examiner

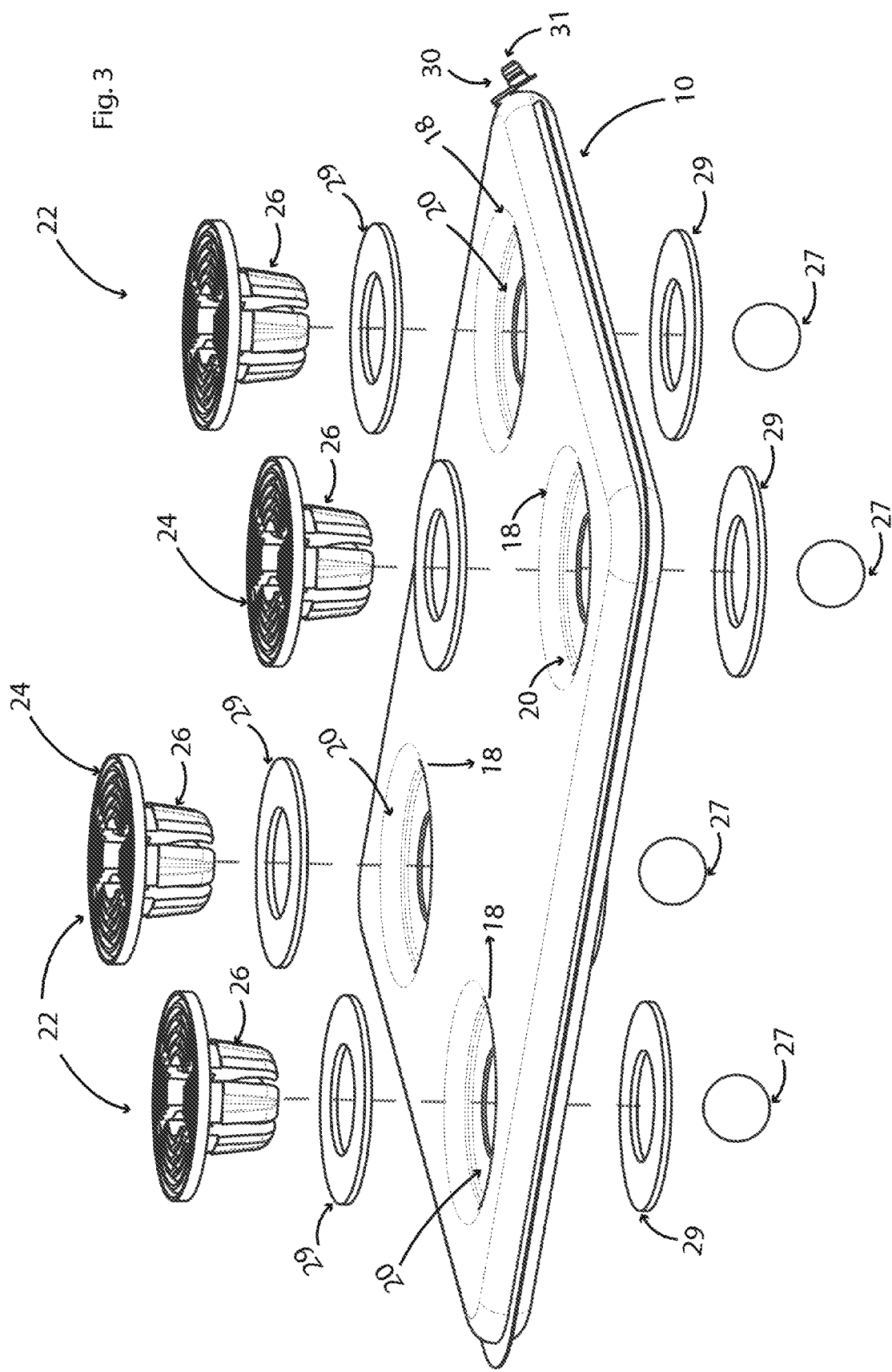

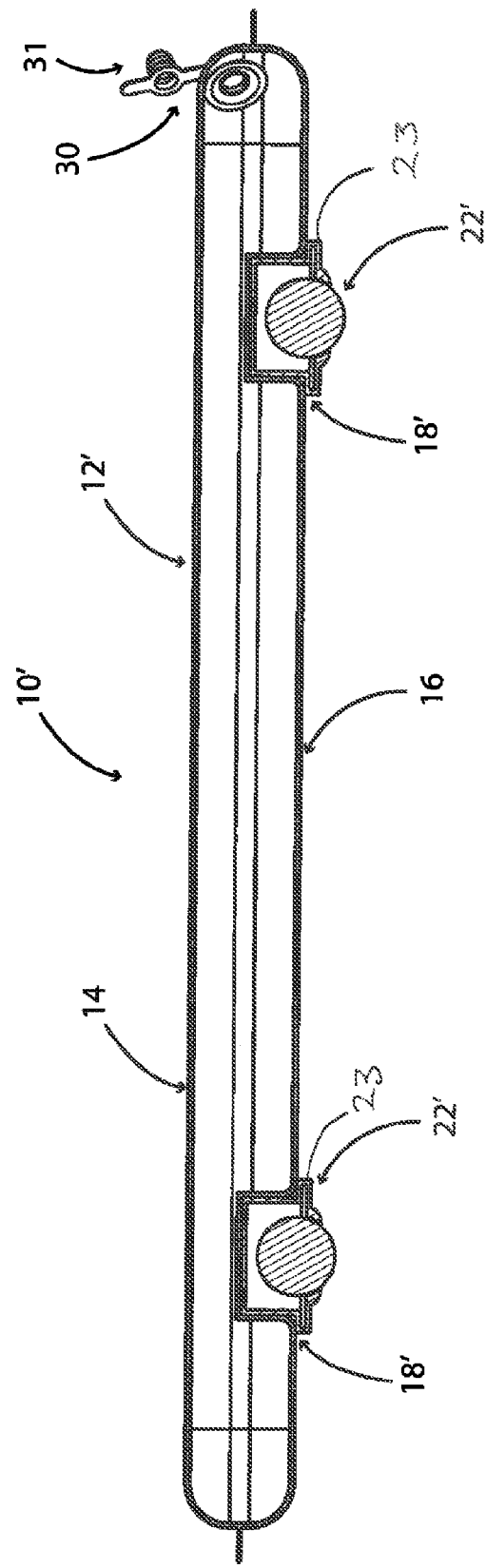

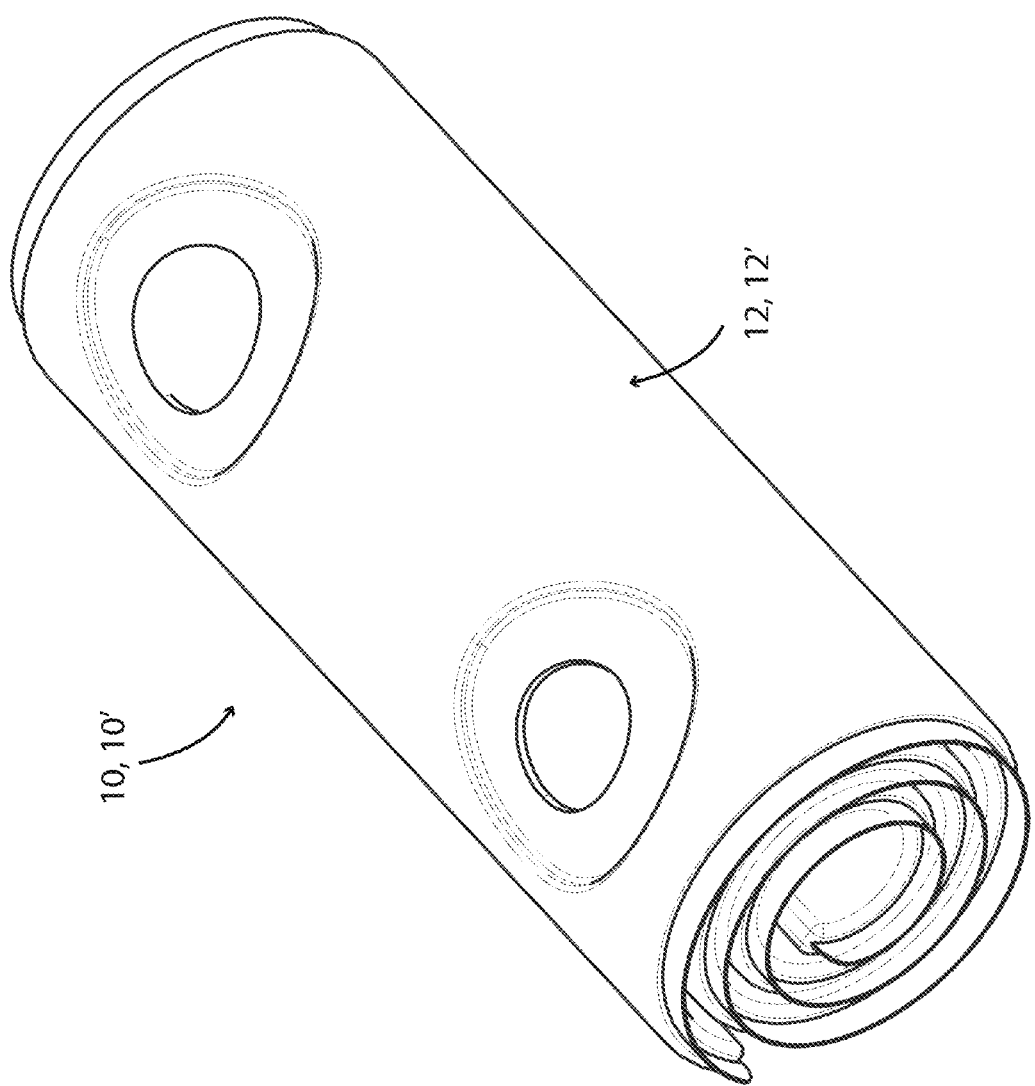

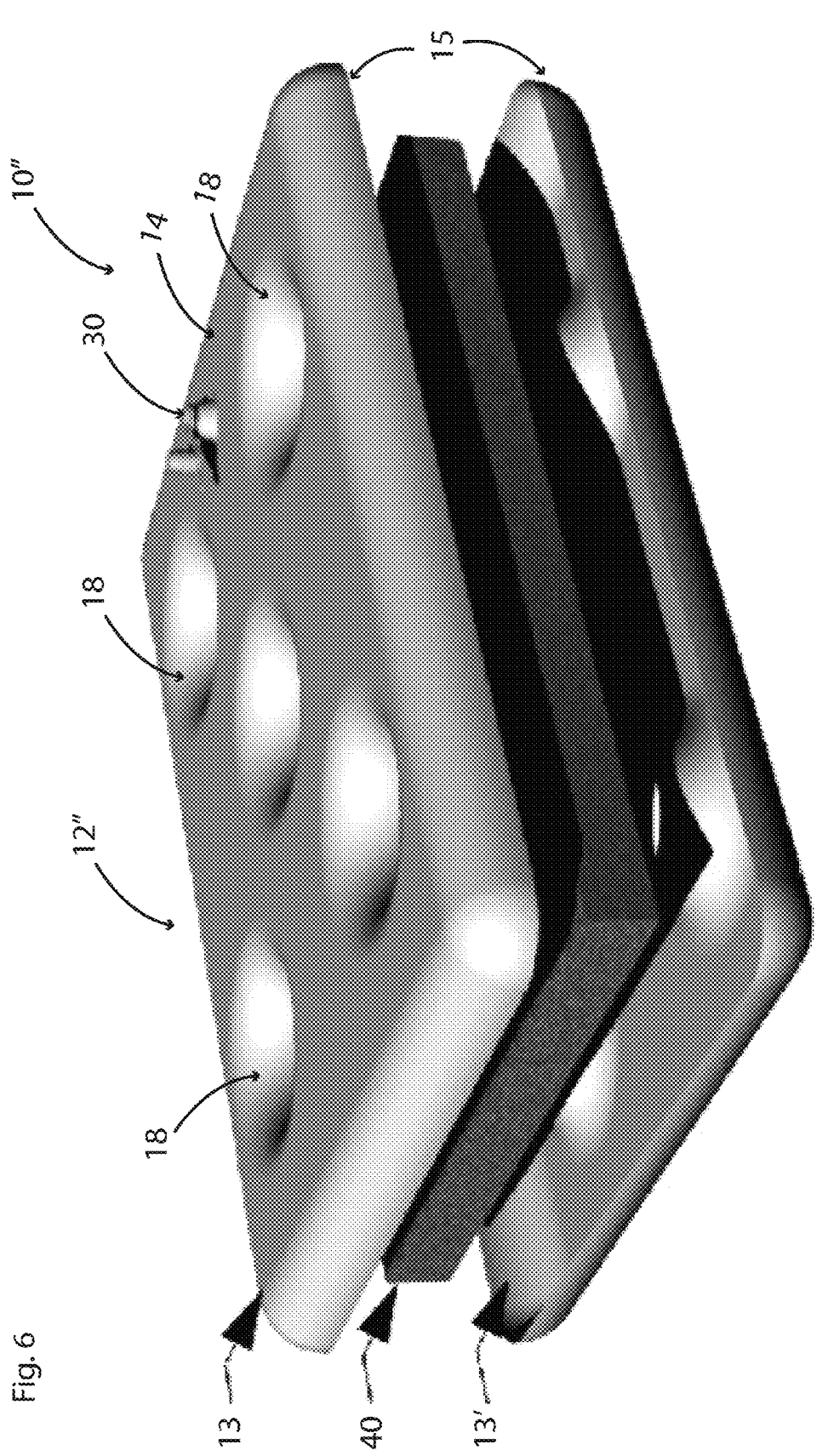

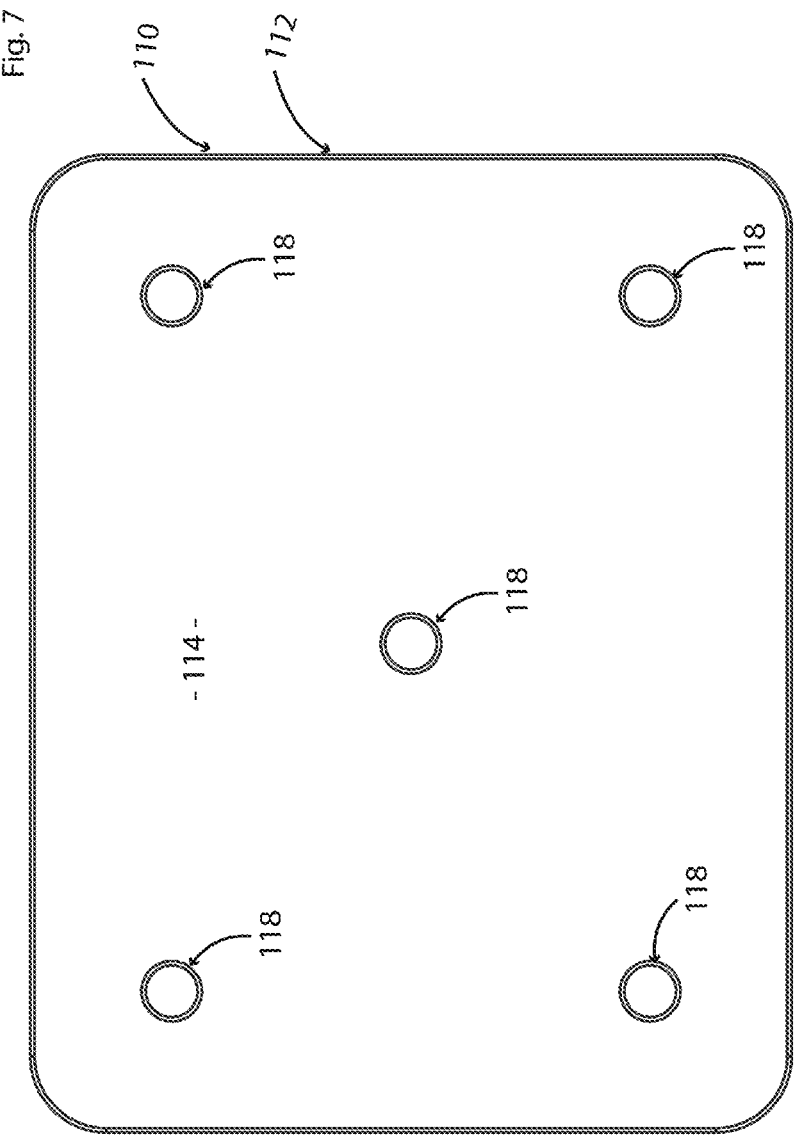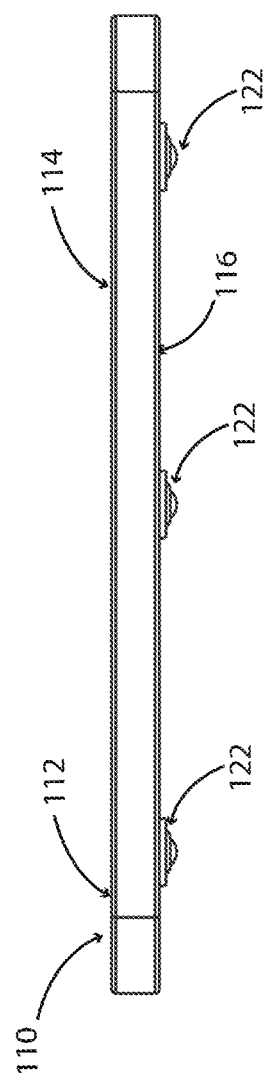

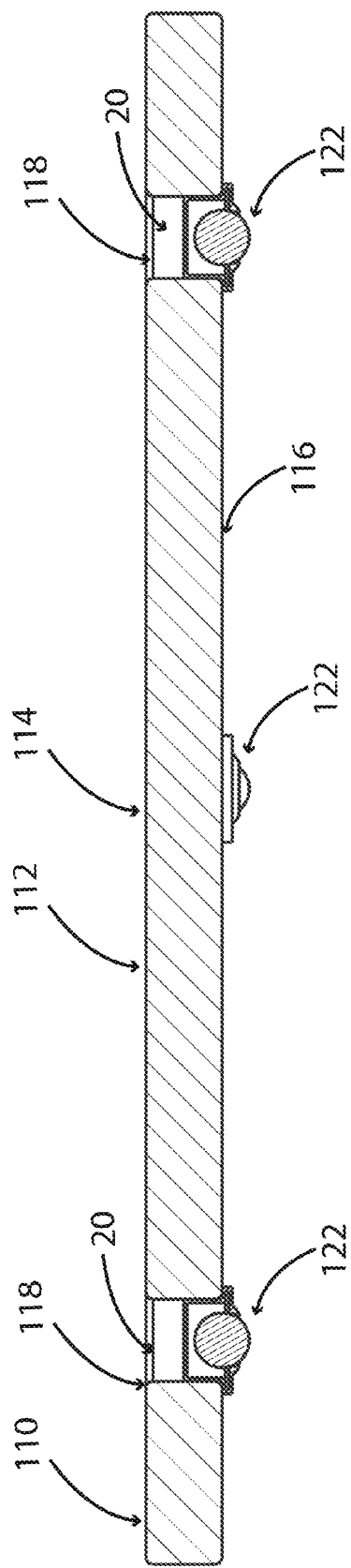

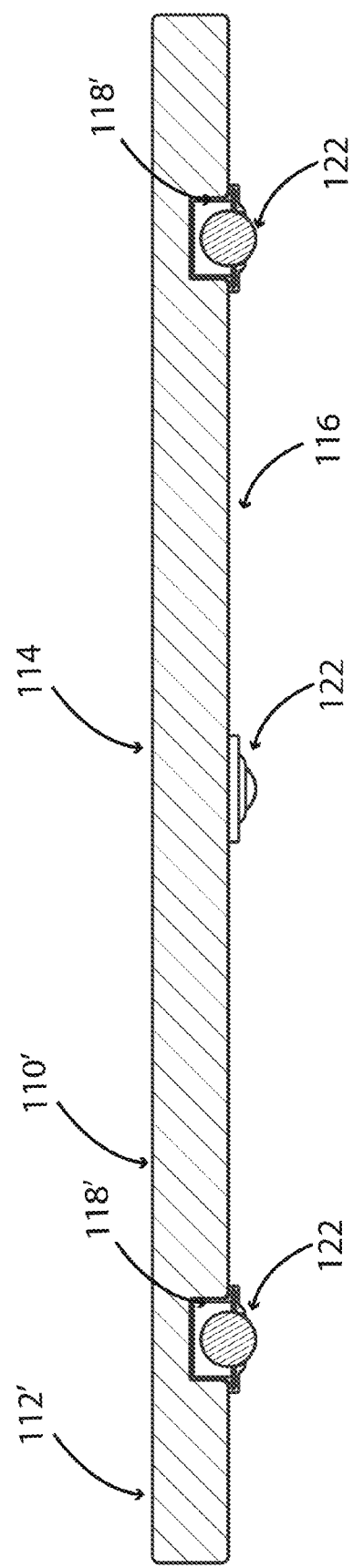

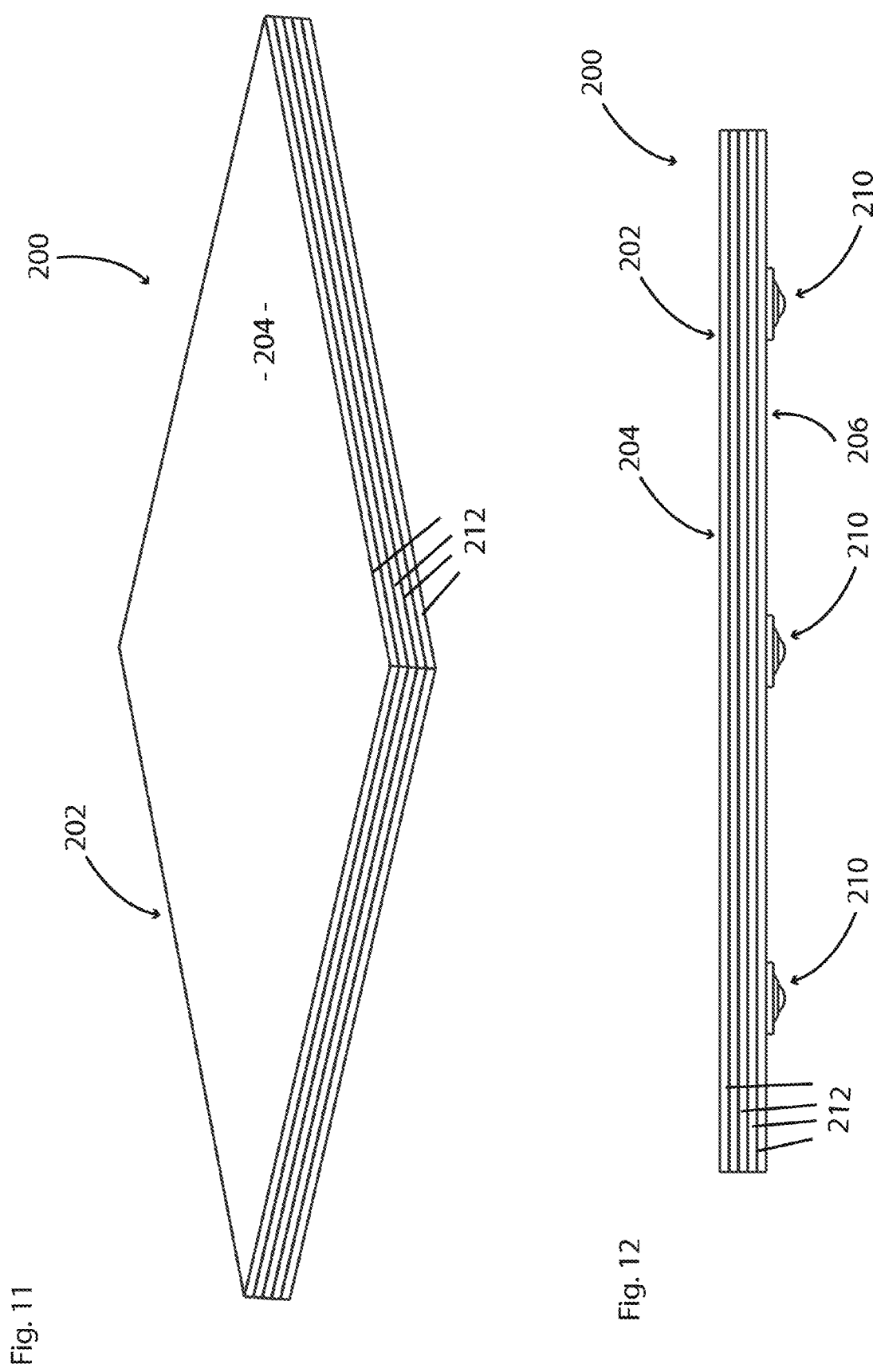

LIGHTWEIGHT DOLLY ASSEMBLY

CLAIM OF PRIORITY

The present application is a continuation application of previously filed, now pending application having Ser. No. 14/095,671, filed on Dec. 3, 2013 incorporated herein by reference.

BACKGROUND OF THE INVENTION

1. Field of the Invention

This invention is directed to a dolly assembly having a base formed of a lightweight material, and by way of example, may comprise an inflatable construction or a substantially solid construction, whether made from one piece of material or several pieces of material, such as may be layered together. The base in each of the embodiments includes a plurality of pockets extending at least partially there-through and a plurality of casters connected to the base by extending through different ones of the plurality of pockets. In at least some of the embodiments, the lightweight material of the base is further characterized by being substantially flexible but having sufficient structural integrity to maintain the plurality of pockets and corresponding casters in a predetermined, spaced relation to one another.

2. Description of the Related Art

The use of dolly structures is quite common for different applications across a wide variety of industrial and domestic environments. As such, dolly structures can be generally categorized as platform dollies, hand trucks, mobile carts, furniture trucks, etc. In each instance, these different types of dollies are intended for use in movably supporting different types of objects over various surfaces. Moreover, the objects being movably supported may vary in weight, size, configuration, etc., and as a result, typically require the selection of a particular type of dolly in order to accommodate the physical characteristics of the object(s) which the dolly is intended to move and be used with. However, the vast majority of known dolly structures, regardless of their use, are typically structured to be heavy, relatively large and formed of a rigid, durable, comparatively high strength material.

By way of example, platform dollies usually have a relatively large wooden platform supported by a plurality of wheels, rollers, casters, etc., which are fixedly secured to the under-portion of the platform. In contrast, hand trucks normally comprise an elongated, vertically extending, upper portion attached to a lower portion having a relatively short, outwardly extending supporting platform. As with platform dollies, the hand truck usually includes fixedly or permanently attached wheels connected generally at the junction of the upper and lower portions. Somewhat similarly, movable carts for supporting one or more objects of different weights may also be considered a type of dolly structure. Weight supporting carts normally include a supporting base and a retaining structure associated therewith in a manner which facilitates the movable support of one or more different objects. Similar to the other dollies noted herein, these cart types of dollies are also characterized by a heavy material that is of a durable construction and intended to have a long operable life.

In addition, each of the above noted types of dolly structures normally includes a fixed operative configuration, or an only minimally alterable, operative configuration. As such, many known or conventional dolly structures cannot be effectively reduced in size, such as by being collapsed or folded, into a configuration which would facilitate storage, transportation and overall ease in the handling thereof, when the dolly structure is not being used.

Therefore, some of the problems and disadvantages associated with known or conventional dolly structures include their inability to be easily altered in size and/or configuration, whether for facilitating storage or in order to accommodate the support of various objects having different physical characteristics such as size, weight, etc. Because of this lack of operative versatility, a consumer may be required to purchase or otherwise access a number of different dollies, each intended for a different application or for carrying limited types of objects. For instance, lighter weight or smaller dolly structures including, but not limited to hand trucks, may be structured to movably support only smaller, relatively lighter loads than the aforementioned platform dollies. And while it is recognized that these types of dollies may include at least some adjustable features or components in order to facilitate the handling and use thereof, such adjustable features do not normally allow the dolly to be enlarged or variably configured into significantly different configurations, which are more adaptive to support objects having larger or unusual shapes.

It is well recognized that in the field of art relating to dollies that the vast majority feature a base portion formed of wood or a metal such as steel. As such, the base of a conventional dolly is typically rigid and relatively heavy. Further, in the structuring of a conventional dolly, it is the base or heavy material that forms the base which is intended to have sufficient rigidity to at least partially support an object disposed thereon and facilitate the distribution of the weight of the supported object to the casters, or like structures, that movably support the base over the floor or other intended ground surface. However, such rigid, heavy materials from which the bases are typically formed detract from the versatility of dolly structures, while adding to the cost in manufacturing them and inconvenience in storage, transportation, use, etc.

Therefore, there is a longstanding need in the field of art relating to the design and manufacture of dollies or other movable support platforms for a new and inventive dolly assembly that is capable of assuming a variety of different supporting orientations and which is also able to facilitate the movable support of a variety of different objects. If any such dolly assembly were made, it would ideally have a small number of components so as to greatly facilitate the manufacturing process as well as its assembly. Any such dolly assembly would ideally have components such as, but not limited to casters or the like that would be removable, replaceable and therefore, re-useable. In certain applications, such components would ideally also be interchangeable and facilitate the formation of a dolly assembly into a variety of operative orientations dependent, at least in part, on the intended application thereof or object which is in need of being moved.

In addition, the versatility and ready availability of any such proposed new dolly assembly, were one developed, would be enhanced if at least some of the components of the dolly structure, such as at least the base, were formed from a lightweight material, which ideally, might also demonstrate or be capable of demonstrating a degree of flexibility. More specifically, a lightweight and/or at least partially flexible material may be sufficiently inexpensive and readily available to economically justify a highly competitive and advantageously low cost thereof, possibly to the extent of allowing any such dolly assembly to be disposable after one or a limited number of uses. As such, if it were possible to develop a new and lightweight dolly assembly, it would ideally be possible to incorporate material to form the dolly assembly from a paper based material or even cardboard, but also foam, plastic, and a variety of other materials. Moreover, the versatility and commercial availability of any such proposed dolly assembly would further be enhanced if at least some of the components of the dolly structure, such as at least the base, were made to comprise an inflatable construction.

It is recognized that the structuring of a dolly assembly from a lightweight and/or at least minimally flexible material is counter-intuitive. If, however, it were possible to accomplish the same, if the resulting dolly assembly were indeed usable for a wide variety of applications and transporting of different objects, it would thereby overcome most of the existing disadvantages of conventional dolly design and construction, which typically require the use of different type dollies for different applications. This, in turn, would readily enable a much larger number of consumers to purchase and/or use a dolly or a requisite number of dolly structures for a particular move, whenever and wherever needed, and to easily store same after use for subsequent use, should that be desired.

SUMMARY OF THE INVENTION

The present invention is intended to present a solution to the needs that exist in this field of art, and as such, is directed to a dolly assembly having a lightweight construction which facilitates its transport, use and overall utility in a variety of different applications. While being lightweight, the various preferred embodiments of the dolly assembly of the present invention still provide adequate support for a plurality of different objects which may vary in weight, size and configuration.

More specifically, each of the preferred embodiments of the dolly assembly comprises a base having an outer exposed surface and an undersurface, which in certain embodiments may be reversed. In addition, a plurality of pockets extends either completely through or at least partially through the base in communicating relation with at least one of the outer opposite surfaces. Further, the different embodiments of the base may be structurally distinguishable, while having common operational features and physical characteristics including, but not limited to, at least a minimum degree of flexibility. However, and as emphasized in greater detail herein, while having a preferred amount of flexibility, the bases of the various embodiments of the dolly assembly have sufficient structural integrity to maintain the plurality of casters, as well as the plurality of pockets in which they are mounted, in a predetermined spaced relation to one another so as to provide a stable, primary support for the corresponding base as well as an object supported thereon.

Moreover, in each of the different structurally distinguishable embodiments of the base, a plurality of casters is disposed in removably connected relation thereto. As such, the attachment of the casters to the base comprises extending each caster at least partially through a different one of the plurality of pockets. Further, due to the lightweight characteristics of the base, as well as the overall structure of the corresponding dolly assembly, the collective disposition or array of the plurality of pockets are such that the plurality of casters disposed therein are positioned to collectively provide the primary support to the corresponding base as well as different types of objects supported on the base.

The plurality of casters, as well as the individual pockets in which they are removably disposed, are arranged in a predetermined spaced relation to one another. As such, the predetermined spaced relation between a plurality of casters, on a corresponding base, comprises their collective disposition in an array which provides a stable and primary support for any object disposed on an outer exposed surface of the base. As set forth above, it is well recognized that the vast majority of conventional dolly structures include a base formed of a rigid, heavy material. As a result, the base material is intended to have sufficient rigidity to at least partially support an object disposed thereon and facilitate the distribution of the weight of the supported object to the casters or wheels movably supporting the base over and intended surface.

Accordingly, the structuring of a dolly assembly from a lightweight at least minimally flexible material may be considered counter-intuitive. However, as described in greater detail herein, the lightweight, flexible material from which some of the embodiments of the base are formed, also include sufficient structural integrity to maintain a predetermined spacing of a plurality of casters, relative to one another, when they are removably connected to the base. Such, structural integrity may include a sufficient amount of strength and/or minimal amount of rigidity of the base material sufficient to maintain the intended predetermined spacing of a plurality of casters relative to one another. Such a "predetermined spacing" of the plurality of casters and corresponding pockets in which they are mounted is intended to be sufficient to collectively position the plurality of casters in an array which provides a stable, adequate, and primary support for one or more objects supported on the base.

As a result, any object supported on the base will typically be supported by all or at least a majority of the plurality of casters. Further, when the casters are connected to the base in their operative, supporting predetermined the spaced position, they are disposed in a predetermined relation to the outer exposed one of the opposite surfaces of the base so as to further facilitate the support of an object disposed on the base. Moreover, due to the flexibility of the material of the base of at least some of the embodiments the outer exposed surface will may be compressed upon confronting an object supported on the base. This will further result in a plurality of casters being disposed in supporting relation to the object on the base.

Further with regard to the plurality of pockets formed in the base, in at least one embodiment the pockets extend completely through the base and have oppositely disposed open ends. As a result, the casters, depending on their specific structural features, are dimensioned and configured to be at least partially positioned within different ones of the pockets. Further, at least a portion of each caster may extend through either of the opposite open ends. In addition, a base with pockets having opposite open ends may also be reversed or be disposed in a reversible orientation. In a practical application this means that either of the aforementioned opposite surfaces of the base may define the outer exposed surface or the undersurface of the base, thereby enhancing the versatility thereof.

In contrast, one or more preferred embodiments include the pockets having only a single open end which extend only partially into the interior of the base. In this one embodiment and in others, the reversible orientation of the base is not feasible and the open end of this type of pocket is disposed adjacent to and/or in direct communication with an undersurface of the base. This corresponding disposition between the single open end of each pocket and the undersurface of the base facilitates the outward extension or protrusion of a corresponding caster so as to facilitate movable engagement of the caster with a supporting structure on which the base is positioned.

In order to further enhance and facilitate an adequate and stable support of a variety of different objects on the base, at least some of at least one embodiment of the plurality of casters may include a generally enlarged head portion having a transverse dimension at least minimally greater than the corresponding pocket in which it is positioned. As a result, passage or inadvertent removal of the caster from a corresponding pocket, such as by passing the enlarged head there through, is restricted. Also, the enlarged head of each of the casters may be disposed adjacent and/or in substantially co-planar relation to the outer surface of the base, such as when the caster is disposed in a pocket having opposite disposed open ends. Such positioning of the heads of the plurality of casters thereby facilitates the aforementioned preferred supporting relation of the casters with the object being supported on the base.

However, one or more additional embodiments of the structure of the plurality of casters may include a caster having a somewhat enlarged bottom portion, with a greater transverse dimension than the correspondingly positioned open end of the pocket in which it is disposed. This structural embodiment of the one or more casters may be used with, but is not limited to, pockets having a single open end, wherein the single open end is disposed in corresponding relation to the undersurface of the oppositely disposed surfaces of the base. More specifically, the at least minimally enlarged bottom portion of the caster, being greater than the transverse dimension of the corresponding open end of the pocket, will prevent the caster from being disposed to far into the corresponding pocket, and will further facilitate support of the base, as well as any object mounted on the base.

In order to further facilitate connecting of the casters to the base in a stable, operative, supporting orientation, each or at least some the casters include a multi-component assembly, wherein the head may be inserted through one open end of a corresponding pocket and a body and roller ball may be inserted through the opposite open end of the corresponding pocket into removable attachment with the corresponding head. Moreover, at least one embodiment of an appropriately structured caster includes an outer peripheral surface of the body thereof being cooperatively and/or correspondingly dimensioned and configured for disposition into confronting relation and/or engagement with the inner surface of the corresponding pocket in which it is disposed. The movable supporting relation of the plurality of casters relative to the base and a supported object is thereby facilitated by the provision of the roller ball or like member extending out of the housing into movable engagement with a supporting structure over which the dolly assembly travels.

As set forth above, the various embodiments of the dolly assembly of the present invention include the base having a lightweight construction such as by being formed from a lightweight material having at least a minimal degree of flexibility. Accordingly, at least one preferred embodiment of the base comprises an inflatable construction, wherein flexible plastic material such as, but not limited to PVC, is structured to include an at least partially hollow interior. As such, the hollow interior of the base is structured to receive and retain an inflating fluid such as, but not limited to, air or other appropriate fluid. As indicated herein, the plurality of pockets formed in the base extend through the hollow interior and may or may not include oppositely disposed open ends.

Also, at least one access device, preferably in the form of a two-way valve or flow tube, is connected to the base in fluid and intended degree of support communication with the hollow interior. Therefore, the access device is structured to facilitate the passage of the inflating air, gas, or other fluid, at least into and preferably into and out of the hollow interior of the base. In addition, the material from which the base is formed preferably includes sufficiently flexible characteristics to selectively dispose it in an expanded orientation, when inflated or a collapsed orientation, when deflated. Therefore, when inflated into the expanded orientation, the base is disposed into and at least minimally semi-rigid configuration or structure, while maintaining an intended degree of flexibility. Therefore, the base, when inflated, assumes a sufficient structural integrity to maintain a predetermined spacing between the plurality of pockets in the base as well as the casters disposed in the respective pockets. As a result, the plurality of casters will be maintained in an array which provides an adequate and intended degree of support of an object thereon. In the deflated, collapsed orientation, the base may be easily stored, transported, etc.

Yet another preferred embodiment of the base includes the aforementioned inflatable construction, as described above, and the additional provision of a reinforcing member disposed within the hollow interior thereof. Further, the reinforcing member may include a substantially solid, one-piece construction having a substantially planar configuration, such as being formed into the shape of a mat, sheet, plate, etc. Moreover, the reinforcing member is preferably dimensioned and configured to extend along at least a majority of both the longitudinal dimension and transverse dimension of the base to which it is connected. Also, the plurality of pockets formed in the base may also extend at least partially through the base or completely through the base resulting in at least some of the pockets having opposite open ends, as set forth above. As also described above, the base of this embodiment when including pockets with oppositely disposed open ends may be reversed such that either of the opposite surfaces may be disposed so as to define the outer exposed surface as well as the undersurface. In addition, in at least one embodiment the reinforcing member is disposed within the hollow interior of the inflated base. In this structural modification, the pockets whether being open ended or having only a single open end, extend through the reinforcing member so as to accommodate the intended positioning of the casters.

The reinforcing member may include physical and structural characteristics which further facilitate or at least enable an at least a minimal flexibility of the inflated base. As such, the reinforcing member may be formed of a flexible material plastic, including, but not limited to, a semi-rigid foam material having at least minimal flexible characteristics. Therefore, the reinforcing member and the material from which it is formed may be accurately described as including a substantially solid, one-piece construction having sufficient structural integrity to maintain the plurality of pockets in the aforementioned predetermined spaced relation to one another. As a result, the casters disposed in the individual pockets are also maintained in the predetermined spaced relation to one another which is sufficient to adequately and properly support an object being disposed on the outer exposed surface of the base.

Yet another preferred embodiment of the dolly assembly includes the base being formed from a single substantially planar one-piece construction of lightweight, at least minimally flexible material including, but not limited to, foam or plastic, as well as other lightweight materials having the intended and preferred physical and operative characteristics. As such, the one-piece solid material base preferably includes an at least partially planar configuration in the form of a sheet, mat, plate, plank or the like. The structure of the one piece base may be similar to, but distinguishable from, the overall structure and/or configuration of the aforementioned reinforcing member, used in combination with the inflatable base embodiment. As with the inflatable base structure, a plurality of casters are disposed in supporting relation to the base by being mounted within a plurality of pockets formed in and extending at least partially through the one piece base. As with the various structural modifications and or embodiments of the base as described above, this substantially solid one-piece base construction may also include a plurality of pockets having oppositely disposed open ends. In this modification the base may be disposed in the reversed orientation as also described above. However, the plurality of pockets may have only a single open end disposed in communicating relation with the undersurface of the one piece base and through which corresponding casters protrude into movable engagement with a supporting structure on which the base is position.

Yet another preferred embodiment of the dolly assembly of the present invention comprises a base including oppositely disposed surfaces and a plurality of pockets disposed in the base and extending at least partially there through. As explained in greater detail hereinafter and as described with reference to the additional embodiments of the dolly assembly of the present invention, the pockets may include a single open end communicating with an undersurface of the two opposite surfaces of the base, when in an operative position. As such, the caster is disposed in a different one of each of the pockets and is cooperatively structured and dimensioned there with to extend at least partially outwardly therefrom to movably engage a support structure for the dolly.

Another structural modification of this embodiment of the dolly assembly includes each, or at least some, of the plurality of pockets having oppositely disposed open ends. As such, each of the opposite open ends of the corresponding pockets being disposed in direct communicating relation with correspondingly disposed ones of the opposite surfaces of the base. It is further noted that when the base of the dolly assembly includes pockets with opposite open ends, either of the opposite services of the base may define an outer exposed surface or an undersurface of the base. Accordingly, the open ends of the plurality of pockets facilitate the use of the base in reversible orientations, thereby further enhancing the versatility of the base. Further, each of the plurality of casters are cooperatively dimensioned and configured with the plurality of pockets such that the casters may be inserted into the base through either of the open ends. When so inserted, the casters may be frictionally or otherwise connected to the interior surface of the pocket in which it is disposed and connected for supporting attachment to the base.

One feature of this embodiment of the dolly assembly is the formation of the base from a substantially lightweight, recyclable material such as, but not limited to, a paper-based material including a recyclable cardboard material. Moreover, the base preferably includes a multilayered construction wherein a plurality of layers of the recyclable paper-based material are interconnected such that the planes of each layer are disposed in substantially parallel relation to one another. It is a further noted that when the plurality of layers, defining the multilayered construction, are connected to one another the base will assume a rigid configuration or construction. As a result, the multilayered material base will be disposed in supporting relation to one or more objects disposed on an outer exposed surface of the base. Concurrently, the predetermined spaced relation of each of the plurality of casters, disposed in different ones of the plurality of pockets collectively define a support of the base and the object disposed on the outer surface thereof.

However, even though the base assumes a rigid configuration when each of the plurality of layers are joined, connected or attached to one another, each of the individual layers, being formed from a recyclable paper-based and or cardboard material may itself be at least partially flexible when it is not connected to others of the plurality of layers defining the multilayered construction. This is due, at least in part, to the material from which each of the layers is formed, as well as the dimensions and overall structures of each of the individual layers of recyclable paper-based material. More specifically, the thickness of each of the plurality of layers defining the multilayered construction may be relatively thin such as, but not limited to, in the range of ⅛ inch to ¼ inch, especially compared to the thickness of the base itself when the plurality of layers are joined into the aforementioned multilayered construction. In order to add further stability to the base, the plurality of pockets, whether open at both ends or only at a single and are arranged to in substantially transverse and or perpendicular relation to the plane of the base. As indicated in greater detail herein, the planes of each of the layers of material defining the multilayered construction will be disposed in substantially parallel relation to one another.

Other features of the various preferred embodiments of the dolly assembly include it being made available in a variety of different sizes and/or configurations. However, due to the lightweight construction of each of the embodiments and the versatility of the dolly assembly, as well as the removable connection of the plurality of casters to the base, the different bases and the different casters of the various embodiments of the dolly assembly can be made commercially available, independently of one another. Therefore, at least some of the embodiments of the base can be disposable, due in part to the lightweight, preferably flexible and relatively inexpensive characteristics of the material from which the various bases are formed. Accordingly, the casters can be reused with different bases rendering the dolly assembly available for a variety of different applications at significantly reduced costs. Somewhat similarly, the casters may also be formed from a relatively inexpensive material, and therefore, can also be disposable after one or more uses. Also the lightweight construction, including the at least minimal flexible nature of the material from which at least some of the embodiments of the base are formed, allow the dolly assembly to be easily transported, stored, and operatively positioned. As a result, the dolly assembly of the present invention overcomes many of the disadvantages and problems associated with more conventionally structured dollies or dolly structured, as generally indicated above.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 3 is a perspective view in exploded form of the embodiment of FIGS. 1 and 2.

FIG. 4 is an interior sectional view of another embodiment of a dolly assembly also including an inflated construction.

FIG. 5 is a perspective view of the base portion of the embodiments of FIGS. 1 through 4 in a collapsed orientation which is also rolled.

FIG. 6 is a perspective view of yet another embodiment of the dolly assembly which also incorporates an inflated construction.

FIG. 7 is yet another preferred embodiment of the dolly assembly of the present invention.

FIG. 8 is a side view of the embodiment of FIG. 7.

FIG. 9 is a longitudinal sectional view of the embodiment of FIGS. 8 and 9.

FIG. 10 is a sectional view of a structural modification similar to but distinguishable from the embodiment of FIG. 7 through 9.

FIG. 11 is a perspective exterior view of yet another preferred embodiment of a dolly assembly of the present invention.

FIG. 12 is a side view of the embodiment of FIG. 11.

Like reference numerals refer to like parts throughout the several views of the drawings.

DETAILED DESCRIPTION OF THE PREFERRED EMBODIMENT

As represented in the accompanying Figures, the present invention is directed to a dolly assembly structured to include a base having a lightweight construction. By way of example, the dolly assembly of this invention may comprise in certain embodiments an inflatable construction or alternatively, a substantially solid construction, whether made from one piece of material or several pieces of material that may be layered together. Additionally, the material used to form the dolly assembly of the present invention may comprise an at least partially flexible material, either at an early manufacturing stage and/or subsequently.

Figure 1:
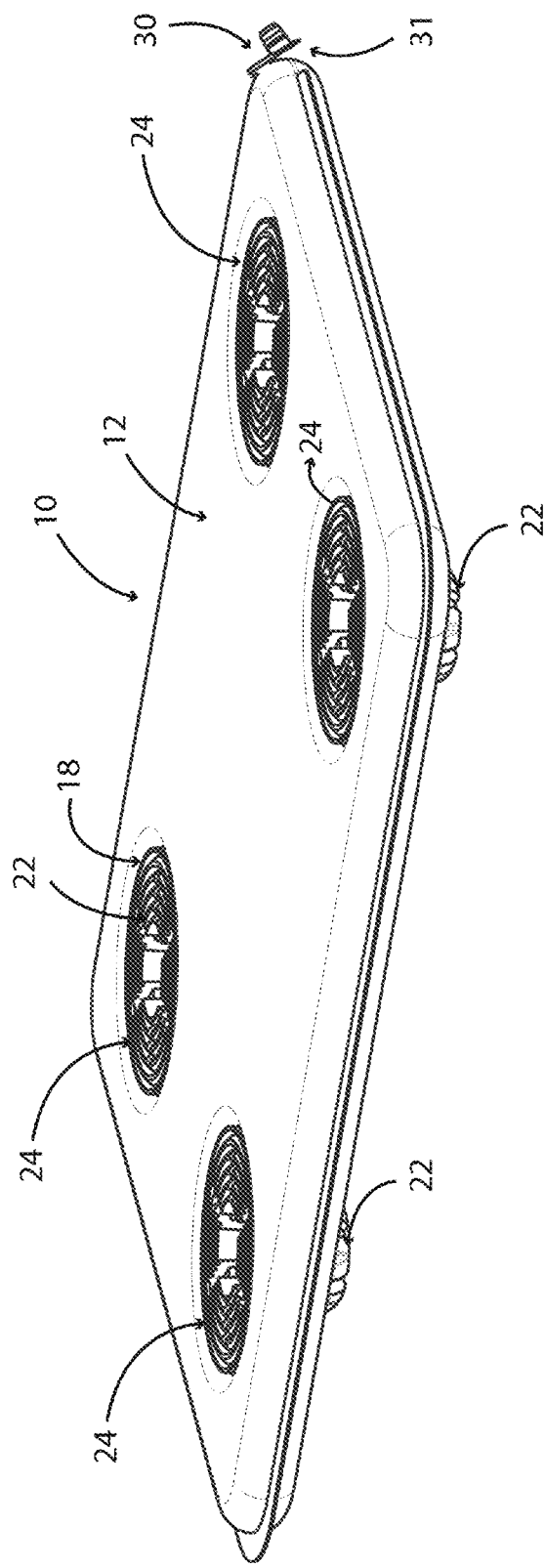
FIG. 1 is a perspective view of one preferred embodiment of the dolly assembly of the present invention comprising an inflated construction.
Figure 2:
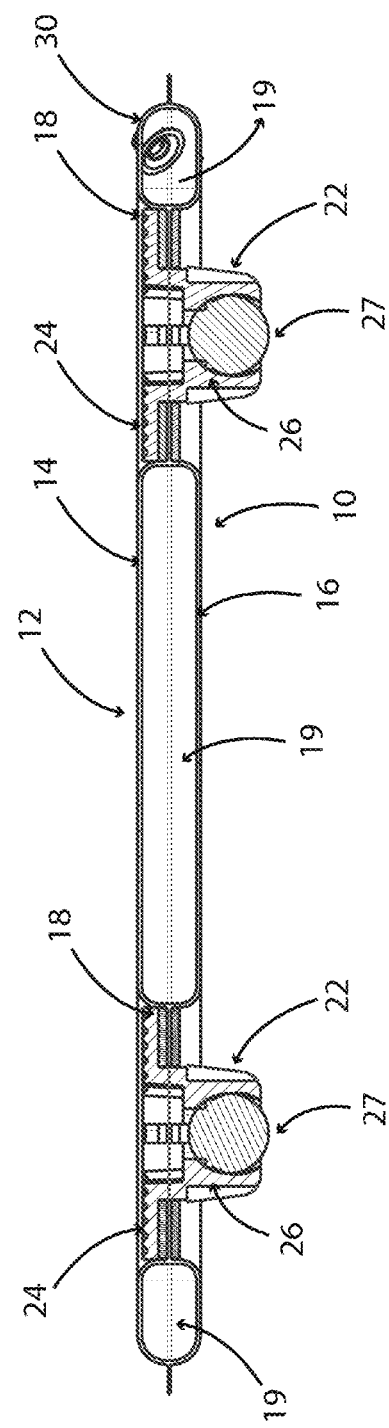
FIG. 2 is a longitudinal sectional view of the embodiment of FIG. 1.

With initial reference to FIGS. 1-4, the dolly assembly 10 includes a base 12 which may be made and/or which may be offered commercially in a variety of different sizes and/or configurations. For purposes of clarity, the base 12 is represented as having a multi-sided and generally rectangular configuration, although a square configuration could also be similarly utilized. However, it is emphasized that the base 12 may have a variety of different multi-sided configurations, or even a circular, curvilinear or other appropriate configuration, which may also be used in different commercial and/or domestic environments and yet still accommodate the movable support of a variety of different objects thereon. In addition, the base 12 includes oppositely disposed surfaces 14 and 16 as best shown in FIG. 2. As set forth in greater detail hereinafter, in certain embodiments of the present dolly assembly 10, the base 12 may have a construction capable of allowing it to assume an orientation capable of being reversed, as can be envisioned from the embodiment shown in FIGS. 1-3 and 6. As such, either of the opposite surfaces 14 and 16 may define an outer exposed surface on which an object may be placed, or an undersurface disposed closest to a structure over which the dolly assembly 10 travels.

With further regard to the possibility of a reversible orientation of the base 12, the embodiments represented in FIGS. 1-3 include a plurality of pockets 18, each of which are shown here to have oppositely disposed open ends in the nature of a hole or aperture. Accordingly, each of a plurality of casters 22 may be disposed in a different one of these pockets 18 or holes. Insertion of the casters 22 in these open ended pockets 18 may be accomplished by inserting different components of the casters 22 through different open ends, as represented. As such, the opposite open ends of each of the pockets 18 also serve to allow the base 12 to be reversed, as set forth above. It is to be further noted that the pockets 18, whether open ended as represented in FIGS. 1 through 3 or alternatively, whether having only a single open end as shown in the embodiment of FIG. 4, may be disposed in a predetermined spaced apart relation to one another. The spacing, relative orientation and number of the pockets 18, as well as the casters 22 disposed therein, may vary depending upon the size of the base 12. Further, the pockets 18 and the corresponding casters 22 are disposed in a predetermined spaced relation to one another so as to better facilitate the support of an object or objects on the outer exposed one of the opposite surfaces 14 and 16. In addition, and as repeatedly set forth herein, various embodiments of the dolly assembly 10, 10', 10" etc. will have a light weight construction, but may also have a substantially or at least partially flexible construction. However, the flexibility of the material from which the respective bases are formed, is such as to have a sufficient "structural integrity" as a finished product, to maintain the predetermined spacing of the plurality of pockets 18 and casters 22, thereby providing a meaningful and intended degree of support for an object disposed on the base 12.

Each of the dolly assemblies 10, 10', etc. additionally includes a plurality of casters 22. While the specific structure of the casters 22 may vary, at least some are shown as including a generally enlarged and flattened head portion 24, a body 26, a roller ball 27 as shown in FIGS. 1 and 2, and in some cases, a plurality of retainers 29, as represented in FIG. 3. In the illustrated embodiment, the casters are also lightweight and preferably made of a plastic material. Also, and as set forth above, various components of the preferred multi-component casters 22 may be inserted through different ones of the opposite open ends of the pockets 18, as also represented in FIG. 3. Each of the enlarged head portions 24 have a sufficiently large transverse dimension so to restrict passage thereof through corresponding ones of the pockets 18, in which they are removably mounted. Due to the lightweight construction of the base 12, as well as the lightweight material from which the various embodiments of the base of the dolly structure 10, 10', 10", etc. are formed, the plurality of casters 22 are disposed and structured to serve as the primary support for the object disposed on the outer exposed surface of the base 12.

It is pointed out that the flexibility and lightweight construction of the material(s) from which the various bases 10, 10', 10" etc. are formed may not provide a meaningful distribution of the weight of an object supported on the base 12 to the all of or the remaining ones of the casters 22 if they are not directly underneath a load. Accordingly, one feature the present invention is the placement of the plurality of pockets 18 and casters 22 in the aforementioned, predetermined spaced apart relation to one another, so as to define a supporting array of casters. When in the predetermined spaced relation to one another, the plurality of casters 22 serve as the "primary support" of an object placed on the outer exposed surface 14 of the base 12. As also indicated the "structural integrity" of the flexible material bases 12 is sufficient to maintain the intended predetermined spacing and supporting array of casters 22 in their proper position to provide the intended and adequate support for carrying a load. For purposes of clarity, the term "structural integrity" is meant to include the flexible material from which the bases 10, 10', 10"

are formed have at least a minimal amount of rigidity, so as to maintain the predetermined spacing between the plurality of pockets 18 and casters 22.

Therefore, each or at least some of the head portions 24 are disposed in an outwardly extended, exposed relation to the outer surface 14. With reference to the embodiments of FIGS. 1-3, the enlarged head portions 24 of the casters 22 may project at least minimally outward from or above the outer surface 14. In alternate structural modification, the head portions 24 may be disposed substantially coplanar with the outer surface 14. In either structural modification, the head portions 24 of the plurality of casters 22 are disposed so as to assume a substantially adjacent relation to the outer exposed surface 14 and possibly in confronting engagement with an object or objects disposed on the outer surface 14 of the base 12. In order to facilitate the aforementioned confronting relation or engagement, the outer surface of the heads 24 may also have a ribbed or other irregular surface to restrict any slippage of the casters 22, relative to the object which the heads 24 engage. Therefore, due to the lightweight physical characteristics and the resulting relatively fragile nature of the material from which the base 12 is formed, a significant amount of the weight of the object being supported on the base 12 will be directed collectively to the plurality of casters 22.

As indicated, preferred structural features of each of the plurality of casters 22 includes the enlarged head portion 24 disposed in confronting relation to an object or objects to be supported on the base 12. However, the body portion 26 of each of the casters 22 should be correspondingly and/or cooperatively dimensioned with the inner surface 20 of each of the pockets 18, 18' formed in the base 12 of the dolly assembly 10. By virtue of this cooperative structuring, the configuration and dimension of the outer or exterior peripheral surface of the body 26 of one or more of the casters 22 are disposed in confronting engagement with the corresponding inner surfaces 20 of the pocket 18, 18' in which they are mounted. As used herein, "confronting relation" and/or "confronting engagement" is meant to include at least a majority of the confronting surface areas of the outer surface of the caster body 26 and the inner surface 20 of each of the pockets 18, 18' being disposed in engaging or minimally spaced relation to one another. As perhaps best represented in FIG. 8, each of the casters 22 preferably includes a roller ball type of structure 27 which projects outwardly from one end of the caster body 26, opposite to the head 24, into movable engagement with an appropriate supporting surface, such as the floor, etc. on which the base 12 is disposed.

In those embodiments of the present dolly assembly 10 which include an inflatable construction, there is provided at least one access device 30. Access device 30 is mounted on the base 12, in fluid communication with a hollow interior 19 thereof. As such, the access device 30 may be in the form of a one-way or two-way valve or flow-through tube, which allows passage of the inflating air, gas, fluid, etc. at least into and preferably out of the hollow interior 19. The access device 30 includes a closure or stopper 31, structured to be positioned into closing relation to the open end of the access device 30 and thereby facilitate stoppage of fluid flow out of the interior of the base 12 once it has been inflated. Accordingly, the structural and operative features of the material from which the base 12 is formed allow it to be inflated into an expanded orientation and deflated into a substantially collapsed orientation, dependent at least in part on whether the base 12 and dolly assembly 10 are intended for use and/or storage.

As set forth above, and as clearly represented in FIG. 4, at least some of the pockets 18' include only a single open end and are structured to facilitate the removable receipt and connection of a correspondingly dimensioned and configured caster 22'. The depth to which the pockets 18' extend into the interior of the base 12' may vary dependent, at least in part, on the overall size of the base 12'. It is of course noted that the structure of the casters 22 and 22' may vary. However, in each structural modification or embodiment, the corresponding casters 22 and/or 22' correspond to the dimension, configuration of and overall structure of the pockets 18 and/or 18' in which they are removably disposed. Moreover, the structural features associated with the one or more casters 22', as well as substantially equivalently structured casters 122 such as shown in FIGS. 8-10 and at 210 in FIGS. 13-16, include an enlarged bottom portion 23, which is has an at least minimally greater diameter than the transverse dimension of correspondingly positioned open end of the pockets 18, 18' in which the casters 22', 122 and 210 are removably mounted. Due to the at least minimally larger bottom portion 23, the body of each of the corresponding casters is prevented from passing too far into the corresponding pocket. Also, the outwardly extending, enlarged bottom portion 23 facilitates the support of the corresponding base to which it is connected, as well as any object supported on the base.

Another feature of the embodiments of FIGS. 1-4 comprising the base 12, 12' having an inflatable construction is represented in FIG. 5 and demonstrates the ability of the base 12 or 12' to be selectively disposed into a collapsed or at least partially folded orientation as represented. When in such a collapsed orientation, the corresponding bases 12, 12' may be easily stored, carried, transported, shipped, etc.

Yet another preferred embodiment of the dolly assembly of the present invention is represented as 10" in FIG. 6. More specifically, the dolly assembly 10" includes a base 12" comprising an at least partially inflatable structure or construction including a first segment 13 and a second segment 13', each formed of a flexible, expandable and collapsible material such as, but not limited to PVC. When assembled, correspondingly disposed seams 15, are integrally or fixedly secured to one another so as to enclose the aforementioned hollow interior 19 of the base 12. Accordingly, the hollow interior 19 is capable of receiving and retaining an inflating fluid such as, but not limited to, air, gas, etc. As with the embodiment of FIGS. 1-3, an access device or valve structure 30 may be used to facilitate flow of the inflating air or like fluid into and/or out of the hollow interior 19 of the base 12" as best represented in FIG. 6. In addition, the base 12" includes an outer exposed surface 14 and an undersurface 16, as well as a plurality of pockets 18 extending through the base 12" such that opposite open ends thereof communicate with the opposite surfaces 14 and 16.

However, as also represented in FIG. 6, the dolly assembly 10" and in particular the base 12", includes a reinforcing member, generally indicated as 40. The reinforcing member 40 is preferably formed of a lightweight plastic, foam or other appropriate lightweight material. While other material may be used to form the reinforcing member 40, the physical characteristics thereof should not detract from the intended lightweight features of the dolly assembly 10', as explained in detail with the reference to FIGS. 1 through 4. Also, the material from which the reinforcing member 40 is formed may be of a substantially solid, one-piece construction such as being formed from the aforementioned foam, plastic, etc. Further, such material may be at least minimally flexible so as to facilitate and or enhance the overall flexibility of the base 12" as intended. At the same time, the solid, one-piece construction of the reinforcing member 40 may have an at least partially planar configuration and assume the shape of a sheet, mat, plate, plank, etc. Also, the reinforcing member 40 includes longitudinal and transverse dimensions sufficient to extend along at least a majority of the corresponding longitudinal and transverse dimensions of the base as clearly represented in FIG. 6.

It should be further noted that the plurality of pockets 18 or 18' extend both through the base 12" and including through the reinforcing member 40. Therefore, the plurality of casters 22, as explained in detail with reference to the embodiment of FIGS. 1-4 extend at least partially through different ones of the plurality of pockets 18, 18'. As also described herein, the enlarged head portion 24 of the caster 22 communicates directly with the outer surface 14 of the base 12". Therefore, the casters 22 and the enlarged head portions 24 are disposable in adjacent or contiguous relation to the outer exposed surface 14 on which one or more objects is placed.

As indicated, the base 12" may be at least partially inflated into an expanded orientation by passing inflating fluid into the hollow interior 19 between the base segments 13 and 13', after these segments have been joined or connected, such as along the peripheral seam or seams 15. In addition, the base 12" may be deflated into an at least partially collapsed orientation, as represented in FIG. 5, upon a removal of the inflating fluid from the hollow interior of the base 12". However, a complete collapse of the base 12" may be prevented due to the presence of the reinforcing member 40. This is due to the fact that the reinforcing member 40 is formed from a more solid yet lightweight material such as foam, plastic or a similar type of material, as indicated, whether such material is now known or to be discovered in the future.

In addition, and as repeatedly set forth herein, the various embodiments of the dolly assembly specifically including but not limited to the dolly assembly 10" may have a substantially flexible construction. However, the flexibility of the material from which the respective bases are formed is such as to have a sufficient "structural integrity" to maintain the predetermined spacing of the plurality of pockets 18 and casters 22, thereby providing a meaningful and intended degree of support for an object disposed on the base 12. Accordingly, in the embodiment of FIG. 6, the "predetermined spacing" of the plurality of pockets 18 and casters 22 is at least partially maintained due to the at least minimal rigidity of the reinforcing member 40, even though the reinforcing member 40 is formed from a substantially flexible material, such as foam, plastic, etc.

Yet another preferred embodiment of the present invention is represented in FIGS. 7-10 and comprises a dolly assembly generally indicated as 110 including a base 112. Similar but distinguishing structural features of the base 112 include its formation from a substantially solid, one-piece construction which may be formed of plastic, foam or a similar, at least minimally flexible material. Accordingly, the plastic, foam or similar material from which the base 112 is formed maintains the lightweight characteristics of the intended and preferred embodiments of the dolly assemblies 10, 10", 110, etc. defining one of the distinguishing features of the present invention. As with the embodiments of FIGS. 1-6, the base 112 includes an outer exposed surface 114 and an undersurface 116. In addition, the base 112 includes a plurality of pockets 118 and 118', collectively arranged in a predetermined array sufficient to facilitate support of one or more objects on or in overlying relation to the outer surface 114.

In addition, and as repeatedly set forth herein, the various embodiments of the dolly assembly 10, 10', 10" and 110, may have a substantially flexible construction. However, the flexibility of the material from which the respective bases are formed is such as to have a sufficient "structural integrity" to maintain the predetermined spacing of the plurality of pockets 118 and casters 122, thereby providing a meaningful and intended degree of support for an object disposed on the respective bases. As also indicated above, the term "structural integrity" is meant to include the fact that the flexible material from which the base 112 is formed has at least a minimal amount of rigidity so as to maintain the predetermined spacing of the pockets 118 and casters 122 relative to one another in order to accomplish an intended role of the plurality of casters 122 as a primary support for an object disposed on the base 112.

A structural modification or variation of the embodiment of FIGS. 7 through 10 is represented in FIGS. 9 and 10. More specifically, the base 112 of the embodiment of FIG. 9 includes the pockets 118 having oppositely disposed open ends. In contrast, the pockets 118' of the base 112' as represented in FIG. 10 have the pockets 118' with only a single open end. As such, the open end of the plurality of pockets 118' are disposed in communicating relation with the undersurface 116, and facilitate the protrusion of corresponding casters 122 through the one open end into supporting relation with a structure on which the dolly assembly 110 is placed.

As also described with other preferred embodiments of the present invention, the structure of the pockets 118 having opposite open ends facilitate the base 112 being able to be disposed in the "reversed orientation". Accordingly, either of the opposite services 114 or 116 may be disposed in the outer exposed orientation or the undersurface orientation.

Yet another preferred embodiment of the present invention is represented in FIGS. 11 through 16 and comprises a dolly assembly generally indicated as 200 including a base 202. The base 202 includes oppositely disposed surfaces 204 and 206 and a plurality of pockets 208 formed therein. Further, a plurality of casters 210 extend into different ones of the plurality of pockets 208 and extend at least partially through the thickness of the base 202.

Figure 13:
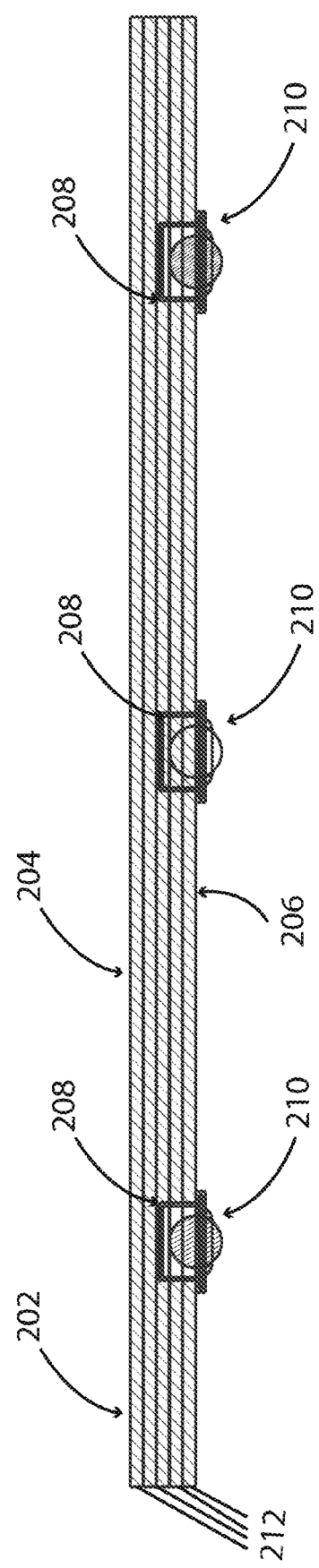
FIG. 13 is a longitudinal sectional view of the embodiment of FIGS. 11 and 12.
Figure 14:
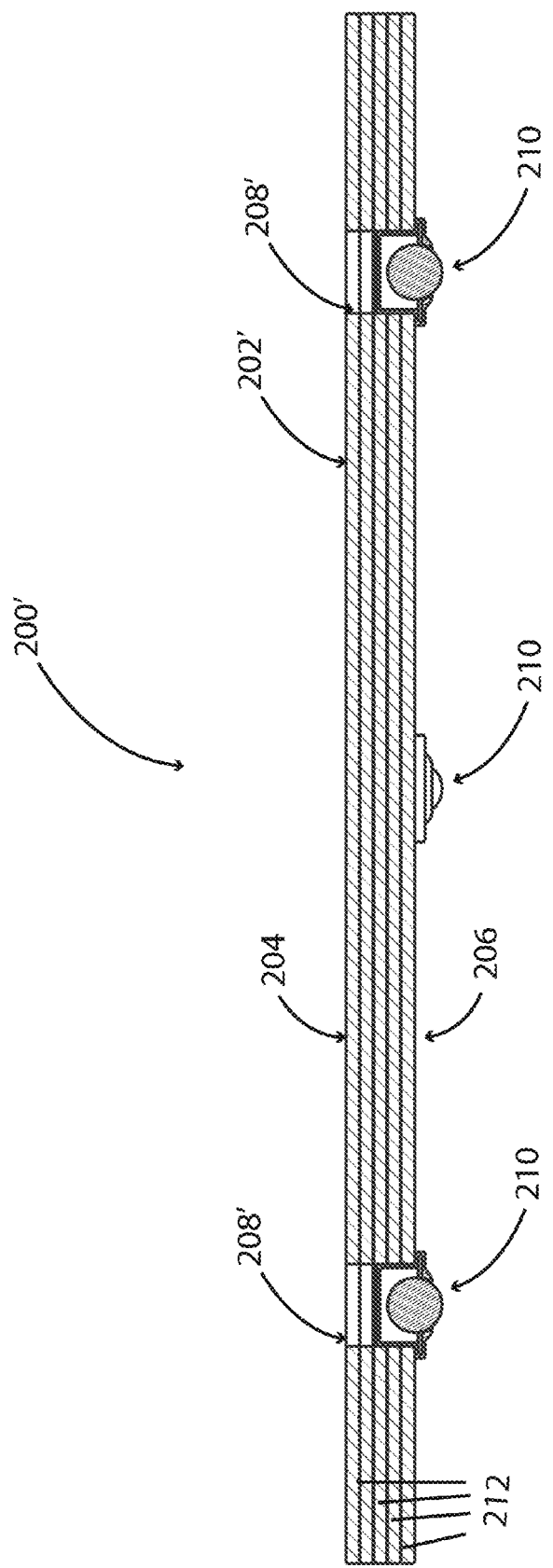
FIG. 14 is a longitudinal sectional view of yet another embodiment of the base incorporating pockets having oppositely disposed open ends.
Figures 15, 16:
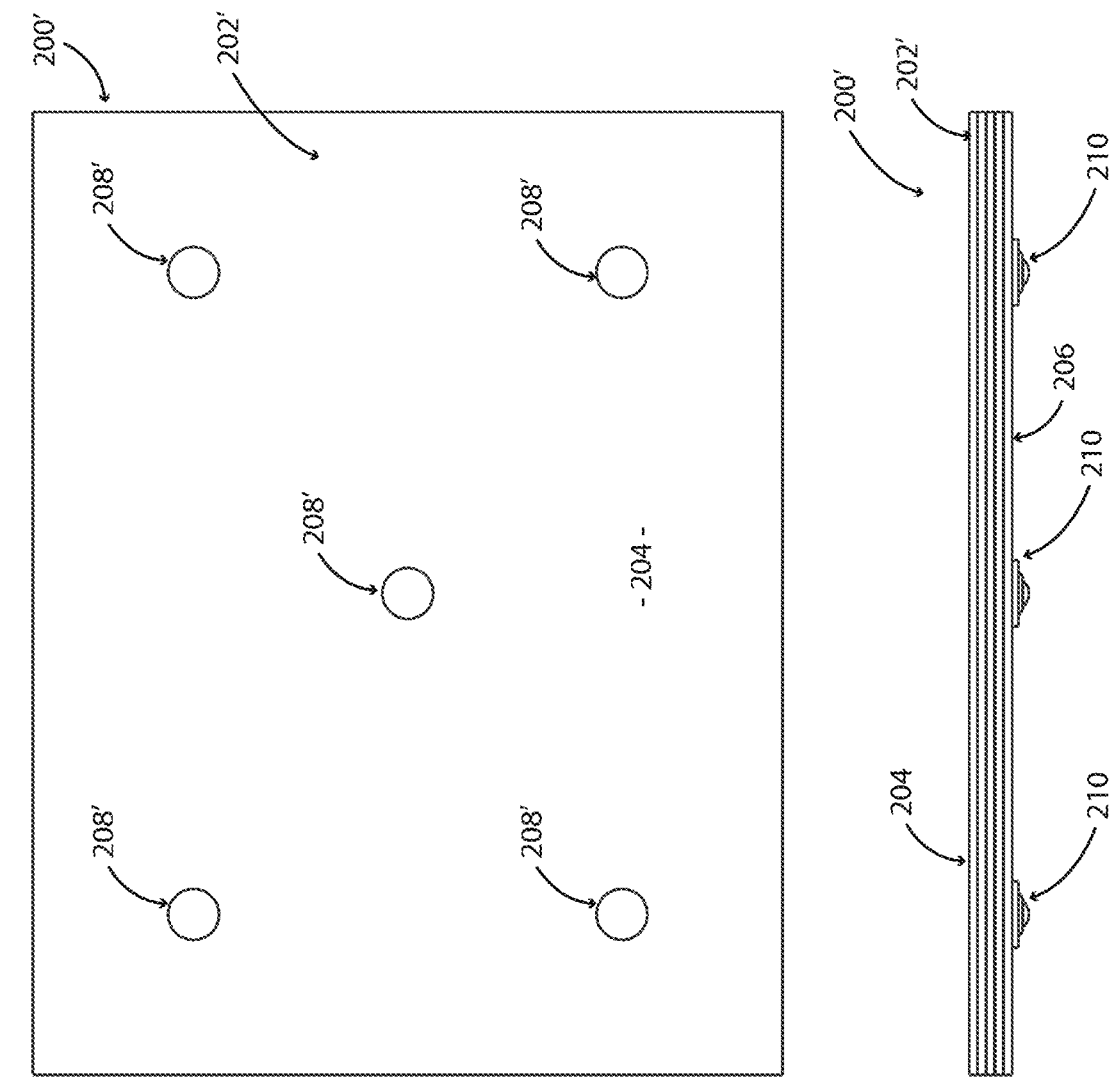
FIG. 15 is a top view of the embodiment of FIG. 14.
FIG. 16 is a longitudinal side view of the embodiment of FIG. 14-15.

With reference to both FIGS. 13 and 14, different structural modifications of the dolly assembly generally represented as 200', include the plurality of pockets 208 having a single open end through which corresponding ones of the plurality of casters 210 extend. In contrast, in FIG. 14, the base 202' includes each or at least some of the plurality of pockets 208' extending completely through the base 202', and thereby includes oppositely disposed open ends. It should be noted that when each or at least some of the plurality of pockets 208' have their opposite ends open, the base 202' may assume a reversible orientation. Moreover, the reversible orientation includes the versatility of this embodiment of the dolly assembly 200', in that either of the opposite surfaces 204 and 206 may be disposed in an outer exposed orientation or an undersurface orientation. In addition, each of the pockets 208' having opposite open ends are cooperatively configured, structured and dimensioned with corresponding casters 210 to facilitate any one of the casters 210 being mounted on or connected to the base 202' by being extended or passing through either of the open ends of the pockets 208'.

Additional structural features of the dolly assemblies 200 and 200' specifically including, but not limited to, the respective bases 202 and 202' include the formation and structuring thereof into a "multileveled construction". More specifically, each of the bases 202 and 202' is formed from a plurality of layers 212 formed from a lightweight, preferably recyclable and at least initially flexible material. Such material may include, but is not limited to, a paper-based material. As used and described herein, the paper-based material from which the plurality of layers 212 are each formed are specifically intended to include, but not be limited to, a cardboard material also including a recyclable cardboard material. Further, the plurality of layers to 212 may vary in number and dimensions. However, when assembled the plurality of layers are interconnected to one another in a parallel relation, represented in FIGS. 11 through 13 and 15, such that the plane of each of the layers 212 are substantially parallel to one another. Also, the method of interconnection, attachment or connection of the plurality of layers 212 may vary but should be appropriate to maintain the layers to 212 in fixed relation to one another during the operable life of the respective dolly assembly's 200 and 200'.

As set forth above, each of the individual layers may be at least initially and partially flexible when not connected to one another. This is due in part to the material from which each the layers 212 are formed as well as the relative small thickness of each of the layers 212 as compared to the thickness of the base 202 and 202' when the layers 212 are connected or attached to one another. By way of example only, each of the layers may have a thickness of generally about, but not limited to, ¼ inch to ⅛ inch. When assembled into the connected relation to one another, the plurality of layers 212 form a base 202 and 202' of sufficiently greater thickness which results in the base 202 or 202' having a rigid configuration or construction.

Since many modifications, variations and changes in detail can be made to the described preferred embodiment of the invention, it is intended that all matters in the foregoing description and shown in the accompanying drawings be interpreted as illustrative and not in a limiting sense. For instance, heretofore the concept of making a dolly assembly from a lightweight and/or flexible material that is also capable of moving a load, including relatively heavy loads, has not been known, let alone a dolly assembly that is easily disassembled and stored, or disposed of, after use. Thus, the scope of the invention should be determined by the appended claims and their legal equivalents.

Now that the invention has been described,

What is claimed is:

1. A dolly assembly comprising:
a base at least partially formed from a substantially flexible material and including oppositely disposed surfaces,
said base comprising an inflatable construction including an at least partially hollow interior structured to retain an inflating fluid therein,
a plurality of pockets extending at least partially through said base in communicating relation with at least one of said opposite surfaces,
a plurality of casters each at least partially disposed within a different one of said plurality of pockets in connected, supporting relation to said base,
at least some of said plurality of pockets and corresponding ones of said plurality casters disposed in a predetermined spaced relation to one another,
said substantially flexible material of said base having sufficient structural integrity to maintain said plurality of casters in said predetermined spaced relation to one another,
a reinforcing member connected to said base and disposed and structured to facilitate maintenance of said plurality of casters in said spaced relation to one another, wherein said plurality of casters collectively define a primary support for an object disposed on said base, and
said reinforcing member disposed within said at least partially hollow interior.

2. A dolly assembly as recited in claim 1 wherein said reinforcing member is dimensioned and configured to extend along at least a majority of the transverse and longitudinal dimensions of said base, at least some of said plurality of pockets extending through said reinforcing member.

3. A dolly assembly as recited in claim 1 wherein said reinforcing member is formed of an at least partially flexible material having sufficient structural integrity to further facilitate maintenance of said plurality of casters in said predetermined spaced relation to one another.

4. A dolly assembly as recited in claim 1 wherein said base comprises a one-piece structure disposable into a substantially planar configuration.

5. A dolly assembly as recited in claim 4 wherein said base is formed from an at least partially solid, flexible material.

6. A dolly assembly as recited in claim 1 wherein at least some of said plurality of casters include a head portion disposed sufficiently close to an outer exposed surface of said opposite surfaces to collectively define a primary support of an object on said base.

7. A dolly assembly as recited in claim 6 wherein said head portions are collectively disposed adjacent said outer surface when an object is disposed on said base.

8. A dolly assembly as recited in claim 6 wherein at least some of said pockets include oppositely disposed open ends, said head portions disposed adjacent corresponding ones of said open ends disposed in said outer exposed surface.

9. A dolly assembly as recited in claim 1 wherein at least some of said pockets include oppositely disposed open ends, said base being reversible, wherein either of said opposite surfaces may define an outer exposed surface or an under surface of said base.

10. A dolly assembly as recited in claim 1 wherein said plurality of casters are removably disposed within corresponding ones of said pockets.

11. A dolly assembly comprising:
a base at least partially formed from a substantially flexible material and including oppositely disposed surfaces,
said base comprising an inflatable construction including an at least partially hollow interior structured to retain an inflating fluid therein,
a plurality of pockets extending at least partially through said base in communicating relation with at least one of said opposite surfaces,
a plurality of casters each at least partially disposed within a different one of said plurality of pockets in connected, supporting relation to said base,
at least some of said plurality of pockets and corresponding ones of said plurality casters disposed in a predetermined spaced relation to one another,
said substantially flexible material of said base having sufficient structural integrity to maintain said plurality of casters in said predetermined spaced relation to one another,
a reinforcing member connected to said base and disposed and structured to facilitate maintenance of said plurality of casters in said spaced relation to one another, wherein said plurality of casters collectively define a primary support for an object disposed on said base,
said reinforcing member being formed of an at least partially flexible material having sufficient structural integrity to further facilitate maintenance of said plurality of casters in said predetermined spaced relation to one another, and
said reinforcing member comprising a mat including an at least partially planar configuration dimensioned and configured to extend along at least a majority of the transverse and longitudinal dimensions of said base.

* * * * *